US00RE40860E

(19) United States
(12) Reissued Patent
Billson et al.

(10) Patent Number: US RE40,860 E
(45) Date of Reissued Patent: Jul. 21, 2009

(54) ELECTROSTATIC AUDIO LOUDSPEAKERS

(75) Inventors: Duncan Robert Billson, Warwickshire (GB); David Arthur Hutchins, Warwickshire (GB)

(73) Assignee: University of Warwick, Warwickshire (GB)

(21) Appl. No.: 11/865,889

(22) PCT Filed: Aug. 28, 2000

(86) PCT No.: PCT/GB01/03837

§ 371 (c)(1),
(2), (4) Date: Feb. 27, 2003

(87) PCT Pub. No.: WO02/19764

PCT Pub. Date: Mar. 7, 2002

Related U.S. Patent Documents

Reissue of:
(64) Patent No.: 7,095,864
Issued: Aug. 22, 2006
Appl. No.: 10/363,048
Filed: Feb. 27, 2003

(30) Foreign Application Priority Data

Sep. 2, 2000 (GB) ..... 00215905

(51) Int. Cl.
*H04R 25/00* (2006.01)
*H04R 1/00* (2006.01)
*H04R 9/06* (2006.01)
*H04R 11/02* (2006.01)

(52) U.S. Cl. ..... 381/191; 381/190; 381/431; 381/152

(58) Field of Classification Search ..... 381/190, 381/191, 431, 423, 152
See application file for complete search history.

(56) References Cited

U.S. PATENT DOCUMENTS

| | | | |
|---|---|---|---|
| 3,942,029 | A | 3/1976 | Kawakami et al. |
| 5,400,414 | A | 3/1995 | Thiele |

FOREIGN PATENT DOCUMENTS

| | | |
|---|---|---|
| DE | 23 30 800 | 1/1975 |
| EP | 0 361 249 | 9/1989 |
| GB | 356778 | 9/1931 |
| JP | 60-46196 | 3/1985 |
| WO | 98/35529 | 8/1998 |
| WO | 02/19764 | 3/2002 |

OTHER PUBLICATIONS

International Search Report for PCT/GB2006/050468, dated Mar. 22, 2007.

*Primary Examiner*—Curtis Kuntz
*Assistant Examiner*—Tuan D Nguyen
(74) *Attorney, Agent, or Firm*—Renner, Otto, Boisselle & Sklar, LLP

(57) ABSTRACT

An electrostatic transducer, such as a loudspeaker or microphone, comprises a multi-layer panel (1) incorporating an electrically insulating middle layer (2) sandwiched between first and second electrically conducting outer layers (3, 4). At least one of the layers has a profiled surface (6) where it contacts the surface of another of the layers. Furthermore a signal generator is provided for applying an alternating electrical voltage across the first and second layers (3, 4) to initiate vibration due to variation of the electrostatic forces acting between the layers, thereby serving as a loudspeaker (or for detecting variation of such electrostatic forces due to received vibration in the case of a microphone). Such a transducer can serve as a low cost audio loudspeaker which can be made lightweight and flexible so as to render it suitable for a wide range of applications, for example to provide sound reproduction in a home environment without requiring any bulky enclosure, or in a notebook computer or mobile telephone.

16 Claims, 2 Drawing Sheets

ELECTROSTATIC AUDIO LOUDSPEAKERS

Matter enclosed in heavy brackets [ ] appears in the original patent but forms no part of this reissue specification; matter printed in italics indicates the additions made by reissue.

This invention relates to electrostatic audio loudspeakers.

Loudspeakers can generally be grouped into three classes of device, namely electrostatic (coil and magnet), piezoelectric and capacitative. Electrostatic loudspeakers are used in many applications, such as hi-fi systems, radios, televisions, computers etc. They have high efficiency and are cheap to produce, although they suffer from the first that they are relatively bulky and heavy. Whilst electrostatic loudspeakers can be made which cover the range of frequency from sub-audio (10 Hz) to the top of the hearing range (20 kHz), it is usual for two or three separate loudspeakers to be used together to span the whole audio frequency range if high fidelity reproduction is required.

Piezoelectric loudspeakers are currently of considerable interest as they can be used to produce relatively flat loudspeakers which are particularly advantageous where space is at a premium, for example in aircraft, cars etc. However such loudspeakers are relatively expensive and are typically several millimeters thick. An inexpensive example of a piezoelectric loudspeaker is the "unimorph" used in singing Christmas cards.

Electrostatic loudspeakers are often considered to give the highest quality audio reproduction. Generally such loudspeakers use an electrically conducting thin membrane between two electrode planes, and alternate the direction of the electric field to move the membrane. However such loudspeakers use very high voltages and require a bulky enclosure.

It is an object of the invention to provide a novel electrostatic audio loudspeaker which is capable of being used in a variety of applications, and particularly in applications where space is at a premium.

According to the present invention there is provided an electrostatic audio loudspeaker comprising a multi-layer panel incorporating an electrically insulating middle layer sandwiched between first and second electrically conducting outer layers, at least one of the layers having a profiled surface where it contacts the surface of another of the layers, and signal means for applying an alternating electrical voltage across the first and second layers to initiate vibration due to variation of the electrostatic forces acting between the layers.

Such a loudspeaker can serve as a low cost audio loudspeaker which can be made lightweight and flexible so as to render it suitable for a wide range of applications. For example such a loudspeaker may be in the form of a large area sheet which can be directly mounted on a wall to provide sound reproduction in a home environment without requiring any bulky enclosure or in a public address system such as may be required in a railway station, for example. Furthermore such a loudspeaker would be particularly suitable for use in applications where space is at a particular premium, for example in a notebook computer or mobile telephone. Since the loudspeaker may also be made transparent, it would also be possible to incorporate it in a computer screen or in a car side window. Because such a loudspeaker can be produced at very low cost, it may also be suitable for novelty items, such as noisy posters and talking or singing cards.

In order that the invention may be more fully understood, reference will now be made, by way of example, to the accompanying drawings, in which.

Figure 1:
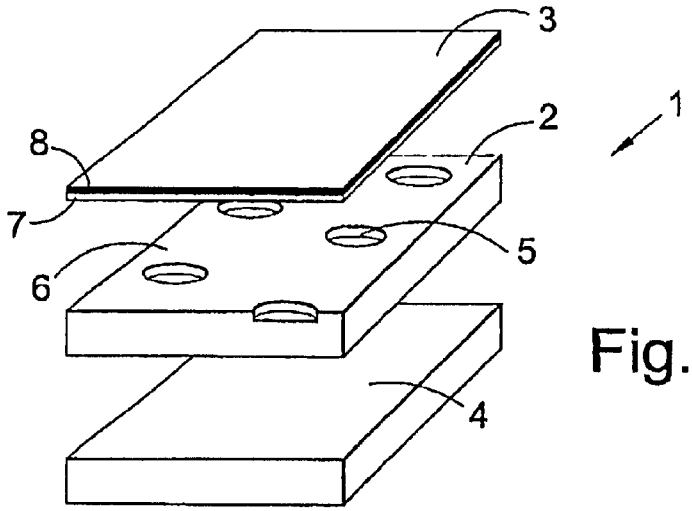
FIG. 1 is an exploded view of part of a first embodiment of the invention.
Figure 2:
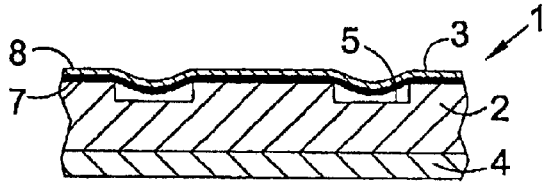
FIG. 2 is a sectional view of the part of FIG. 1.
Figure 3:
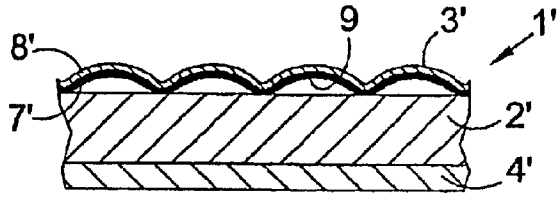
FIG. 3 is a sectional view of part of a second embodiment of the invention.

A simple construction of loudspeaker 1 in accordance with the invention will now be described with reference to FIGS. 1 and 2, FIG. 2 showing a section through part of the loudspeaker 1. This part comprises a multi-layer panel consisting essentially of three layers, namely an electrically insulating middle layer 2 sandwiched between first and second electrically conducting outer layers 3 and 4. The middle layer 2 is a profiled polymer membrane having circular pits 5 in its surface 6 which is in contact with the first layer 3. The first layer 3 comprises a thin polymer membrane 7 provided with a layer 8 of a metallisation applied to its outer surface by a known metallisation process, such as vapour deposition. Although the second layer 4 is shown as a separate layer in FIG. 1, this layer 4 may simply be constituted by a layer of metallisation applied to the back surface of the middle layer 2 by a conventional metallisation process.

Figure 4:
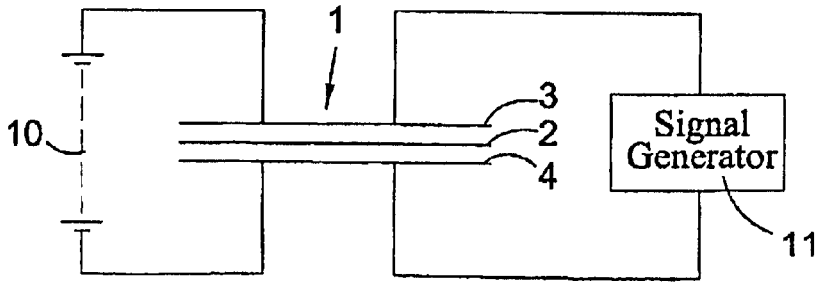
FIG. 4 is an exemplanatory diagram showing a simple drive circuit for energising these embodiments.

As shown diagrammatically in FIG. 4, a d.c. power supply 10 is provided for supplying a d.c. potential, of 100V for example, across the first and second layers 3 and 4. Furthermore a signal generator 11 is connected across the first and second layers 3 and 4 for applying an alternating signal to drive the loudspeaker 1. Although not shown in FIG. 4, capacitative decoupling may be used to separate the d.c. and a.c. voltages. The d.c. potential causes the first layer 3 to be drawn onto the middle layer 2 such that those portions of the first layer 3 which overly the pits 5 form small drumskins which are distributed over the surface of the loudspeaker. When the audio signal is applied by the generator across the layers 3 and 4, the electrostatic forces acting between the layers 3 and 2 are caused to vary and this in turn causes the drumskins to resonate, the first layer 3 essentially being held taut over the pits 5 against air springs. This causes the relevant parts of the first layer 3 to vibrate and the air immediately above it generates the required sound. Careful choice of the profiling of the middle 2 (the number, distribution, size and shape of the pits 5) may be used to optimise the response of the loudspeaker to provide optimum clear audio reproduction.

In a variation of such a loudspeaker 1' having an electrically insulating middle layer 2' sandwiched between first and second electrically conducting outer layers 3' and 4', the first layer 3' is profiled instead of (or in addition) the middle layer 2'. In this case the first layer 3' again comprises a polymer membrane 7' to which a layer 8' of metallisation has been applied, but in this case the first layer 3' is profiled, for example by being scrunched up prior to being applied to the middle layer 2' or by having a regular pattern embossed thereon so as to produce, in effect, recesses 9 on the surface of the first layer 3' which contacts the middle layer 2'. It will be appreciated that, when such an arrangement is driven as described with reference to FIG. 4, the recesses 9 will produce a similar effect to that already described in that the first layer 3' will be caused to vibrate against a spring system provided by the air spring and/or the mechanical resilience of the material of the layer 3'.

Such a loudspeaker does not require the large voltages required by conventional electrostatic loudspeakers since the electrostatic field is large because the separation of the electrodes is small. A reasonably small voltage, say of the order of 36V may therefore be used to produce such an electric field (although higher voltages may be required in some cases to generate larger acoustic amplitudes).

In a further variation the d.c. supply 10 may be eliminated completely by using a permanently charged material for the membrane 7, 7' and/or the middle layer 2, 2'. Such permanently charged materials are commercially available in sheet form at low cost, such as the Clingz film supplied by the Permacharge Corporation. Such an arrangement ensures that the layers 2 and 3 are held together by electrostatic attraction. Furthermore such electrostatic charges may even be used to hold the panel on a wall. Such an arrangement simplifies the operation of the loudspeaker (eliminating the need for a separate d.c. power supply), but may reduce the amplitude of sound generated.

Figure 5:
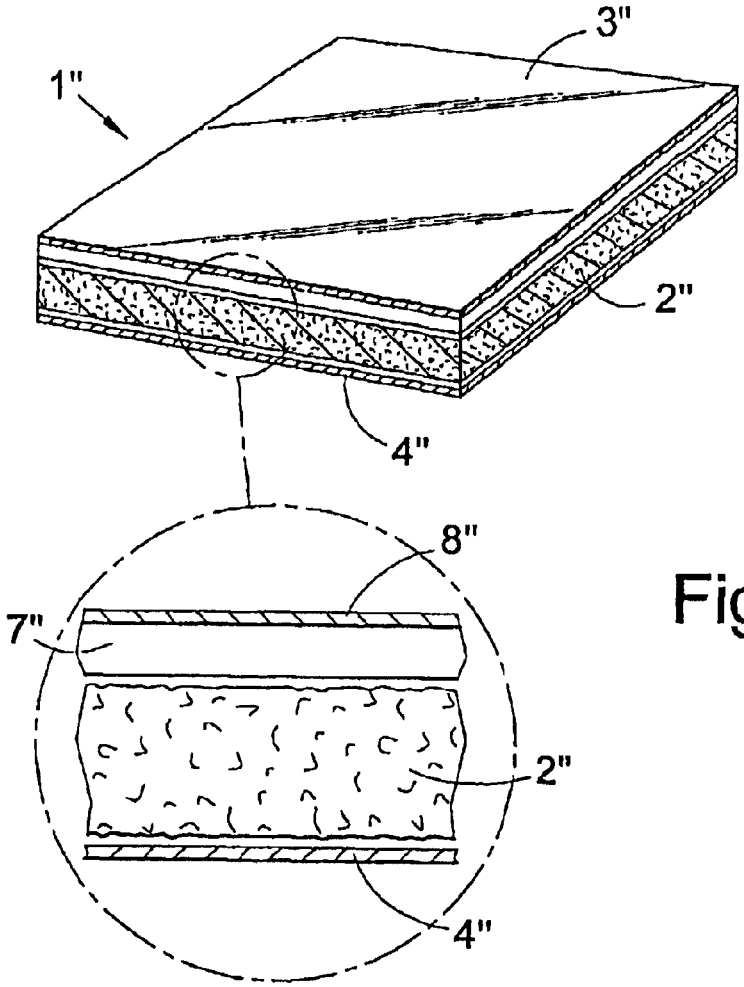
FIG. 5 is a perspective view of a third embodiment of the invention.

In a further variation of loudspeaker 1" having an electrically insulating middle layer 2" sandwiched between first and second electrically conducting outer layers 3" and 4", as shown in FIG. 5, the middle layer 2" is formed by a sheet of a thin porous material, such as paper or tissue. As shown by the enlarged detail in the figure, the first layer 3" again comprises a polymer membrane 7" to which a layer 8" of metallisation, such as a layer of aluminium, has been applied. This will produce a loudspeaker which operates in a similar way to those already described, but with some further advantages which may be useful for certain applications. A porous material inevitably has a profiled surface, albeit on a microscopic scale, since it incorporates holes in its surface. Use of a porous middle layer 2" helps the movement of the membrane 7" in that it is not constrained against movement in the forward direction (i.e. away from the middle layer 2") by a pressure imbalance, in the form of a partial vacuum behind the membrane 7". This is particularly so for lower acoustic frequencies which require greater membrane displacements, and would generate a greater partial vacuum. For membrane movement in the reverse direction (towards the middle layer 2"), the compressibility of a material such as paper or tissue provides a resilient force which complements or replaces the drumskin tensional forces described previously.

Figure 6:
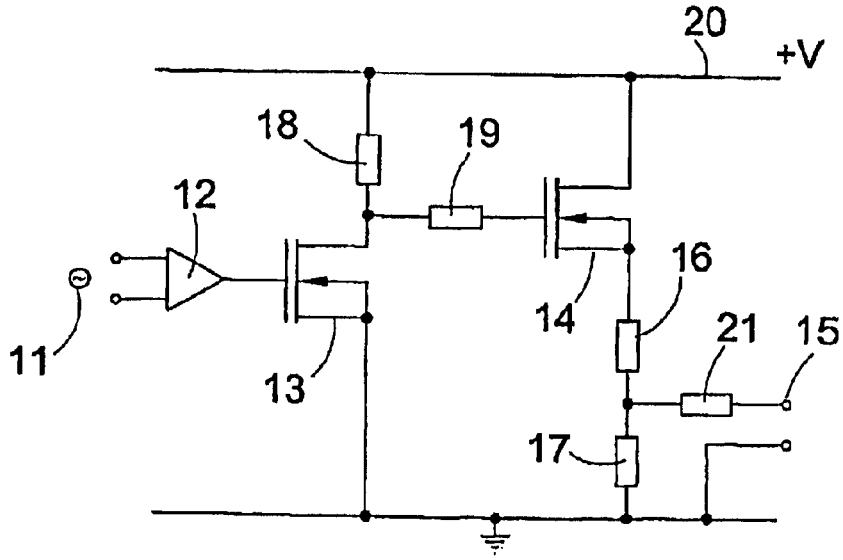
FIG. 6 is a circuit diagram of a drive circuit for use with the invention.

FIG. 6 shows a drive circuit, which may be used to drive such a loudspeaker, having an audio input 10 for receiving an audio input signal to be amplified by a pre-amplifier 12. The signal is then applied to a pair of MOSFET's 13, 14 which are biased by resistors 18, 19 and supplied with power from a voltage supply rail 20, which is typically connected to a +200V supply. The output 15 from this circuit is connected to drive the loudspeakers. By careful choice of resistors 16, 17, 21 the output can be adjusted to have a suitable d.c. bias voltage, as well as an a.c. signal voltage.

Because of the thinness of the layers, the loudspeakers in accordance with the invention described above are not only very thin, i.e. less than 0.5 mm, but are also flexible allowing them to be easily contoured. Such contouring can either be used to fit the loudspeaker to suit its environment, for example to fit within a room with curved walls or within a curved computer casing or screen, or to modify the emitted acoustic field, for example by being made concave to focus the sound or convex to spread the sound. Such a loudspeaker can be adapted very easily to a potential frequency bandwidth in air up to 2 MHz. Whilst the loudspeaker may have poorer low frequency response, such a low frequency response can be improved by careful design of the loudspeaker components.

The thin profile of such loudspeakers gives them an advantage over more conventional loudspeakers in applications where space is at a premium, for example in notebook computers and mobile telephones. Furthermore, by using transparent polymers and electrodes, it would be possible to produce transparent loudspeaker panels which can be used either in front of computer screens, giving advantages in terms of directionality of sound, or within car windows, both for the purposes of audio reproduction and noise reduction. The low weight of the loudspeakers, together with their thin profile, also offers considerable potential for use in aerospace and other specialist applications, either for audio reproduction or for noise cancellation.

The loudspeakers are inherently efficient at generating sound from electrical signals and can consequently be considered to be low power. This is of particular advantage where power consumption is at a premium, for example with battery powered devices such as notebook computers, novelty Christmas cards, or even novel audio advertising posters.

The ability to produce large areas of loudspeaker at relatively low cost using such a construction also offers novel applications for home audio systems, allowing loudspeakers to be hung as well as wallpaper on walls or ceilings. In this regard large area sound sources have potential advantages for the sound field of such audio systems. Furthermore, if a permanently charged polymer film is attached to the rear of the loudspeaker, the resulting electrostatic forces can be used to stick the loudspeaker to the wall, enabling the loudspeaker to be rolled up and moved to a new location when required.

It would also be a relatively straightforward task to enable a single loudspeaker sheet to be separated into separate elements, either by cutting the sheet or by screen-printing rear electrodes in multiple areas. This would provide the ability to produce surround sound by controlling separate speaker elements to provide the required audio image in a sound stage.

A further application of the invention is to noise cancellation systems in which ambient noise is cancelled by the generation of anti-noise by a loudspeaker component in accordance with the invention.

The invention claimed is:

1. An electrostatic loudspeaker comprising a multi-layer panel incorporating an electrically insulating middle layer (2,2',2") sandwiched between first and second electrically conducting outer layers (3,3',3";4,4',4"), at least one of the layers (2,2',2";3,3',3";4,4',4") having a profiled surface where it contacts the surface of another of the layers, *the three layers (2,2',2";3,3',3";4,4',4") being separately formed so as to be capable of vibrating relative to one another,* the profiled surface being an uneven surface and signal means (11) for applying an alternating electrical voltage across the first and second layers (3,3',3";4,4',4") to initiate vibration of the first layer (3,3',3") relative to the middle layer (2,2',2") due to variation of the electrostatic forces acting between the layers (2,2',2";3,3',3";4,4',4").

2. A loudspeaker according to claim 1, wherein the multi-layer panel is flexible.

3. A loudspeaker according to claim 1, wherein the middle layer (2,2', 2") is made of a permanently electrostatically charged material.

4. A loudspeaker according to claim 1, wherein the middle layer (2,2', 2") is made of a material which does not remain permanently electrostatically charged, and biasing means (10) is provided for applying a steady-state bias potential across the first and second layers (3,3', 3"; 4,4', 4").

5. A loudspeaker according to claim 1, wherein the middle layer (2, 2') is made of a polymeric material.

6. A loudspeaker according to claim 1, wherein the middle layer (2") is made of a porous material.

7. A loudspeaker according to claim 1, wherein the first layer (3,3', 3") comprises an electrically conducting film (8,8', 8") applied to the outer surface of an electrically insulating membrane (7,7', 7").

8. A loudspeaker according to claim 7, wherein the membrane (7,7',7") is made of a polymeric material.

9. A loudspeaker according to claim 1, wherein the middle layer (2, 2") has a profiled surface in contact with the first layer (3,3").

10. A loudspeaker according to claim 9, wherein the middle layer (2) is provided with pits (5) over which the first layer (3) extends.

11. A loudspeaker according to claim 1, wherein the first layer (3') has a profiled surface (6) in contact with the middle layer (2').

[12. A loudspeaker according to claim 1, wherein the second layer (4,4', 4") comprises a layer of metallisation applied to a back surface of the middle layer (2, 2', 2") by a metallisation process.]

13. A loudspeaker according to claim 1, wherein the multi-layer panel has a thickness of less than 0.5 mm.

14. A loudspeaker according to claim 1, wherein the multi-layer panel is flat.

15. A loudspeaker according to claim 1, wherein the multi-layer panel is curved.

16. A loudspeaker according to claim 1, wherein the multi-layer panel is at least partly transparent.

17. A loudspeaker according to claim 1, wherein a plurality of loudspeakers are provided on a single panel.

* * * * *

UNITED STATES PATENT AND TRADEMARK OFFICE

CERTIFICATE OF CORRECTION

PATENT NO. : RE 40,860 E
APPLICATION NO. : 11/865889
DATED : July 21, 2009
INVENTOR(S) : Duncan Robert Billson et al.

It is certified that error appears in the above-identified patent and that said Letters Patent is hereby corrected as shown below:

Front Page, Section (22) PCT Filed: "Aug. 28, 2000" should read -- Aug. 28, 2001 --.

Signed and Sealed this

Twenty-second Day of September, 2009

David J. Kappos

David J. Kappos
*Director of the United States Patent and Trademark Office*